US006669268B2

(12) United States Patent
Oberheide

(10) Patent No.: US 6,669,268 B2
(45) Date of Patent: Dec. 30, 2003

(54) LOST MOTION MECHANISM FOR POWER LIFTGATE CLOSURE SYSTEM

(76) Inventor: G. Clarke Oberheide, 4401 Deacon Ct., Troy, MI (US) 43098

( * ) Notice: Subject to any disclaimer, the term of this patent is extended or adjusted under 35 U.S.C. 154(b) by 0 days.

(21) Appl. No.: 10/288,891

(22) Filed: Nov. 6, 2002

(65) Prior Publication Data

US 2003/0085589 A1 May 8, 2003

Related U.S. Application Data

(60) Provisional application No. 60/332,930, filed on Nov. 6, 2001.

(51) Int. Cl.[7] .................................................. B60J 5/10

(52) U.S. Cl. ...................................... 296/146.8; 296/56

(58) Field of Search .......................... 296/146.8, 146.1, 296/147, 146.9, 146.11, 56, 106, 76, 202; 49/139, 337, 340, 344, 345, 346, 348, 349, 350, 351, 360

(56) References Cited

U.S. PATENT DOCUMENTS

| | | | | | |
|---|---|---|---|---|---|
| 3,713,472 | A | * | 1/1973 | Dozois | 296/56 |
| 6,055,775 | A | * | 5/2000 | Dering et al. | 296/56 |
| 6,055,776 | A | * | 5/2000 | Dettling et al. | 296/56 |
| 6,092,337 | A | * | 7/2000 | Johnson et al. | 296/56 |
| 6,138,412 | A | * | 10/2000 | Rieckmann et al. | 49/349 |
| 6,142,551 | A | * | 11/2000 | Ciavaglia et al. | 296/56 |
| 6,270,147 | B1 | | 8/2001 | Butler et al. | |
| 6,283,535 | B1 | | 9/2001 | Yuge | |
| 6,298,604 | B1 | * | 10/2001 | Rogers, Jr. et al. | 296/146.8 |
| 6,318,025 | B1 | * | 11/2001 | Sedlak | 296/56 |
| 6,367,864 | B2 | | 4/2002 | Rogers, Jr. et al. | |
| 6,382,706 | B2 | | 5/2002 | Yuge et al. | |
| 6,398,288 | B1 | * | 6/2002 | Yuge | 296/146.4 |
| 6,425,205 | B2 | * | 7/2002 | Wygle et al. | 296/56 |
| 6,513,859 | B2 | * | 2/2003 | Yuge | 296/146.4 |
| 6,550,839 | B2 | * | 4/2003 | Rogers, Jr. et al. | 296/56 |

* cited by examiner

*Primary Examiner*—Joseph D. Pape
*Assistant Examiner*—H. Gutman
(74) *Attorney, Agent, or Firm*—Clark Hill PLC

(57) ABSTRACT

A power liftgate assembly is disclosed for moving a liftgate between an open position and a closed position. The liftgate is secured to a motor vehicle having a roof. The power liftgate assembly includes an elongated bracket that is fixedly secured to the roof of the motor vehicle. The elongated bracket extends between first and second ends. A motor is fixedly secured to the elongated bracket. A slide operatively engages the motor. The slide moves along the elongated bracket. An articulated bracket is connected to the slide and moves with the slide. The articulated bracket includes a slot that extends therealong to provide lost motion between the articulated bracket and the slide. An arcuate bracket extends between the articulated bracket and the liftgate for receiving the motion of the articulated bracket and for moving the liftgate in response thereto.

15 Claims, 4 Drawing Sheets

LOST MOTION MECHANISM FOR POWER LIFTGATE CLOSURE SYSTEM

This application claims benefit of U.S. Prov. No. 60/332,930 filed Nov. 6, 2001.

FIELD OF THE INVENTION

The invention relates to a power liftgate assembly for a motor vehicle. More specifically, the invention relates to a power liftgate assembly providing lost motion for manual override.

DESCRIPTION OF THE RELATED ART

Many motor vehicles including liftgates have the capability of driving the liftgate between its open and closed positions. When operating such an assembly, the operator merely needs to operate a switch and the liftgate latch will release and an electric motor will drive the liftgate between positions.

One disadvantage to many systems is the inability to adequately allow the operator the opportunity to manually move the liftgate. More specifically, the motor creates a resistance force that must be overcome in addition to overcoming the force assist struts that aid in maintaining the liftgate in an open position.

U.S. Pat. No. 6,283,535 discloses a vehicle liftgate power operating system. The operating system moves a hinged liftgate between its open and closed positions. An electric motor is operatively connected to a rack through a speed reduction device. The rack member is pivotally connected to an arm that is fixedly secured to the liftgate. A rotational force generated by the motor moves the rack axially, which is translated by the arm into a force directed at the liftgate pushing it about its pivot axis to move the liftgate between its open and closed positions. An electromagnetic clutch is required to break the torque transmitted from the motor to an output gear should manual operation of the liftgate be desired or required. The electromagnetic clutch is a heavy and costly item.

U.S. Pat. No. 6,142,551 discloses a vehicle liftgate power operating system. This system incorporates two motors that drive two linkages that are connected to the liftgate. The two linkages are arcuate and move through an arcuate path to move the liftgate between open and closed positions. This system does not, however, contemplate the manual movement of the liftgate.

U.S. Pat. No. 3,713,472 discloses a linkage system for a liftgate that is operable in a power mode and a manual mode. A drive gear provides power to move the liftgate between its extreme positions. An arcuate slot in the drive gear provides lost motion allowing the liftgate to be operated in manual mode, should it be desired to do so. This reference lacks in that the assembly is too large to be incorporated into the contemporary liftgate systems that require much of the liftgate mechanism to be housed in the headliner of the motor vehicle.

SUMMARY OF THE INVENTION

A power liftgate assembly is disclosed for moving a liftgate between an open position and a closed position. The liftgate is secured to a motor vehicle having a roof for pivotal movement about a substantially horizontal axis. The power liftgate assembly includes an elongated bracket that is fixedly secured to the roof of the motor vehicle. The elongated bracket extends between first and second ends. A motor is fixedly secured to the elongated bracket. A slide operatively engages the motor. The slide moves along the elongated bracket. An articulated bracket is connected to the slide and moves with the slide. The articulated bracket includes a slot that extends therealong to provide lost motion between the articulated bracket and the slide. An arcuate bracket extends between the articulated bracket and the liftgate for receiving the motion of the articulated bracket and for moving the liftgate in response thereto.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
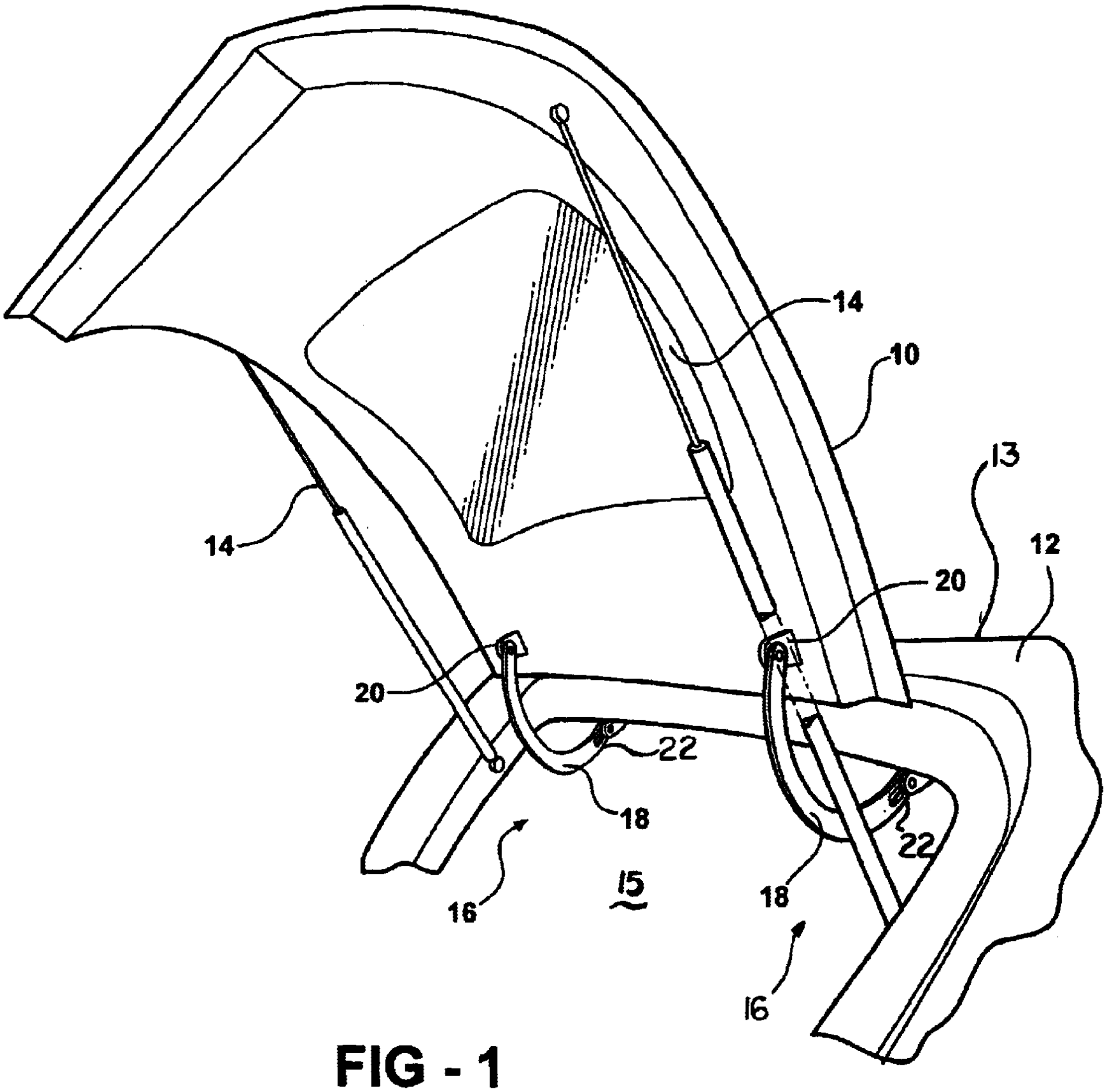
FIG. 1 is a perspective view of a liftgate mounted to a support structure in its open position and incorporating one embodiment of the invention.

Referring to FIG. 1, a liftgate 10 is secured to a motor vehicle 12. The liftgate 10 is shown in an open position in FIG. 1. The liftgate 10 is hingedly secured to a roof 13 to move from the open position to a closed position where it closes an opening 15 in the motor vehicle 12 that provides access to a passenger compartment therein. Two gas assist struts 14 aid in overcoming the mass forces of the liftgate 10 to move the liftgate 10 to its fully open position as it is shown in FIG. 1. The gas assist struts 14 are capable of moving the liftgate 10 to its open position once the liftgate 10 is moved away from its closed position a predetermined distance.

The inventive mechanism is generally indicated at 16. While two mechanisms 16 are shown, the description will describe only one mechanism as each is identical to the other.

The mechanism 16 is a power liftgate assembly 16. The power liftgate assembly 16 includes an arcuate bracket 18. The arcuate bracket 18 extends through an arcuate path between liftgate 20 and linkage 22 ends. The liftgate end 20 is secured to the liftgate 10 whereas the linkage end 22 is secured to a linkage, discussed subsequently.

Figure 2:
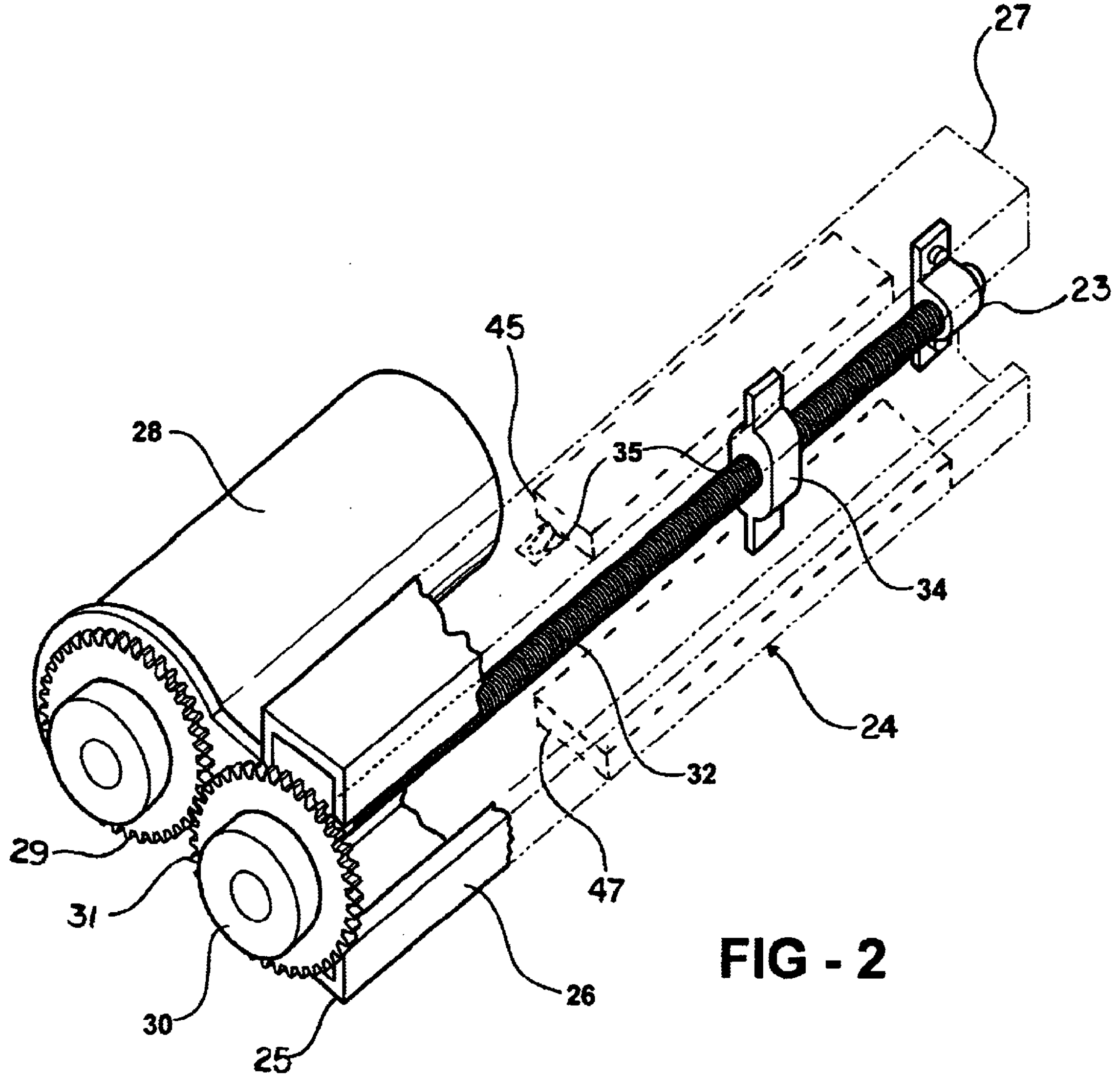
FIG. 2 is a perspective view of a portion of one embodiment of the invention with the slide removed therefrom for clarity.

Referring to FIG. 2, the linkage is generally indicated at 24. The linkage 24 includes an elongated bracket 26 that is secured to a section of the roof 13 of the motor vehicle 12. The elongated bracket 26 extends between first 25 and second 27 ends. A motor 28 is secured to the first end 25 of the elongated bracket 26. In the preferred embodiment, the motor 28 is a JOHNSON 60 N-mm motor with a 64:1 gear reduction. The motor 28 operates bidirectionally allowing it to open and close the liftgate 10.

A number of gears 30 translate the output of the motor 28 into rotational motion of a lead screw 32. The lead screw 32 extends along the elongated bracket 26 and is secured thereto with a bracket 23 that includes a bushing to allow the lead screw 32 to rotate relative to the bracket 23 and the elongated bracket 26. The number of gears 30 includes two gears 29, 31 that each has forty teeth.

A drive unit 34 receives the force of the motor 28 and moves along the elongated bracket 26 between the first 25 and second 27 ends. In the preferred embodiment, the drive unit 34 is a drive nut 34 that rides along the lead screw 32 as the lead screw 32 is rotated in one direction or another by the motor 28. The drive nut 34 is an SAE 660 bronze nut with a mating thread. The drive nut 34 engages a switch 35 identifying the location of a neutral position for the drive nut 34. The neutral position for the drive nut 34 is the location along the elongated bracket 26 in which the drive nut 34 returns after it operates. The function of the drive nut 34 and its neutral position being discussed in greater detail subsequently.

Figure 3:
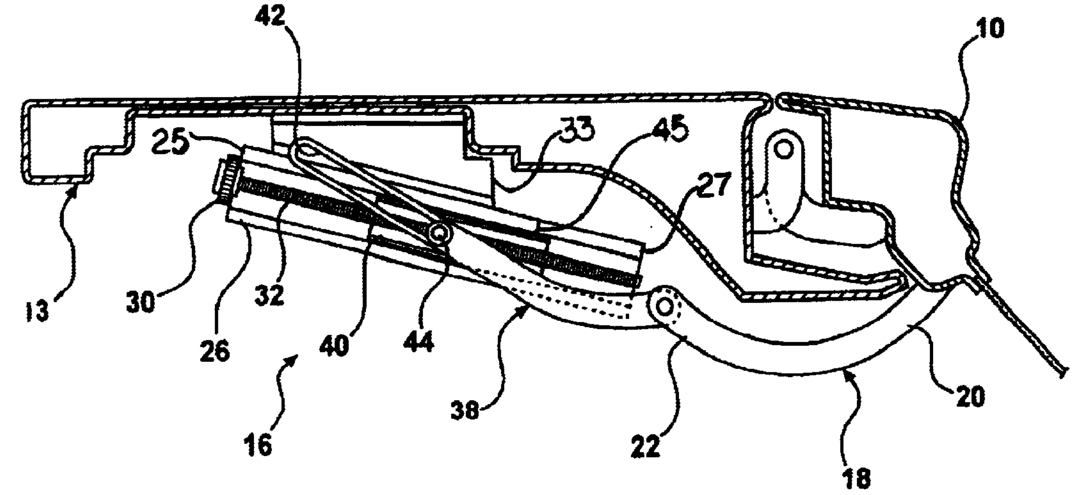
FIG. 3 is a side view, partially cut away, of one embodiment of the invention secured to a motor vehicle with the liftgate in the closed position.
Figure 4:
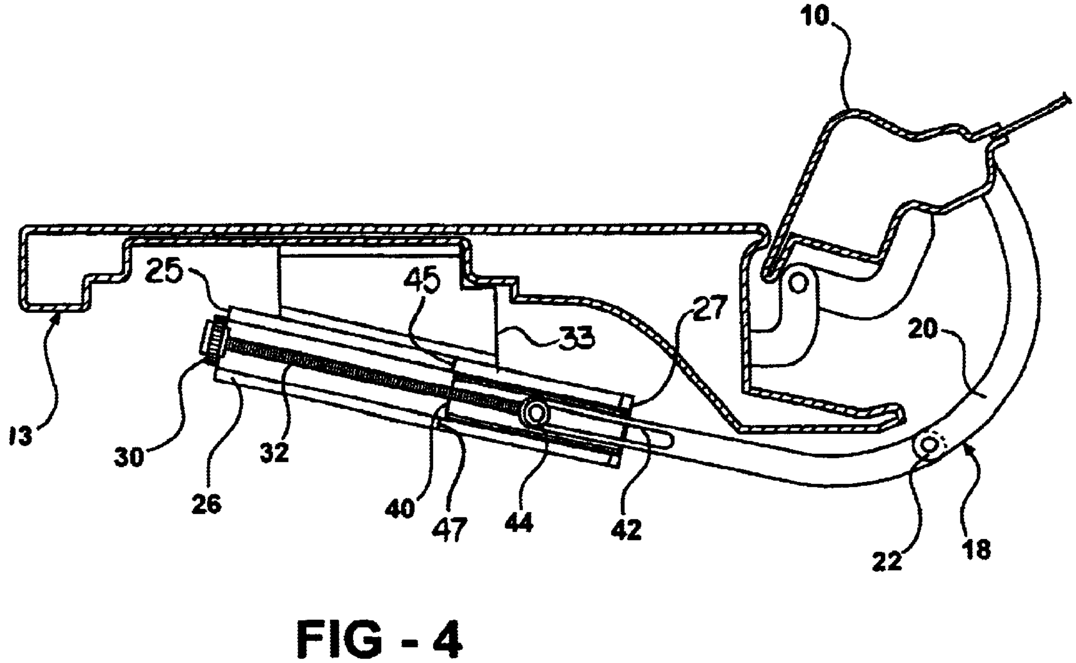
FIG. 4 is a side view, partially cut away, of one embodiment of the invention secured to a motor vehicle with the liftgate in the open position.

Referring to FIG. 3, the mechanism 16 is fixedly secured to the roof 13 of the motor vehicle 12 with a mounting bracket 33. The liftgate 10 is partially shown hingedly secured to the roof 13. An articulated bracket, generally indicated at 38, extends between the arcuate bracket 18 and a slide 40. The articulated bracket 38 includes a slot 42 for receiving a portion of the slide 40 therethrough. In the embodiment shown, a roller 44 is shown to extend through the slot 42. The roller 44 is fixedly secured to the slide 40.

The slot 42 provides lost motion between the motor 28 and the articulated bracket 38. The slot 42 allows the liftgate 10 to move with respect to the motor 28 without having to overcome forces that are required to move the motor 28.

The slide 40 moves axially along the elongated bracket 26 as the drive nut 34 travels along the lead screw 32. Two glides 45, 47 extend between the slide 40 and the elongated bracket 26 to facilitate the movement of the slide 40 with respect to the elongated bracket 26. The glides 45, 47 are approximately 160 mm long and are manufactured from polyethylene. The glides 45, 47 may also have a side that may include self-flushing scallops (not shown).

In operation, with the drive nut 34 in its neutral position, the liftgate 10 is manually free as the slide 40 moves freely with respect to the drive nut 34, depending on the position of the liftgate 10 prior the manual movement. During power closure, the motor 28 causes the drive nut 34 to move linearly away from the liftgate 10. The drive nut 34 contacts the end of the slot 42 and moves the articulated bracket 38 forward. The liftgate 10 is also moved downward and forward until its latch closes the liftgate 10. Upon latching, the drive nut 34 travels through the slot 42 back toward its neutral position.

During power opening and after the liftgate 10 is unlatched, the motor 28 causes the drive nut 34 to travel away from its neutral position back toward the liftgate 10. When the drive nut 34 engages the back of the slot 42, it forces the liftgate 10 to move away from its closed position until the gas assist struts 14 are capable of lifting the liftgate 10 to its open position. Once a liftgate position sensor (not shown) identifies the liftgate 10 is in a position that no longer needs mechanical assistance, the motor 28 is reversed and the drive nut 34 is returned to its neutral position. The drive nut 34 is able to move in a direction away from the liftgate 10 because it is traveling through the slot 42.

During power closing of the liftgate 10, the drive nut 34 is moved toward the motor 28 freely until it reaches the end of the slot 42, whereafter it drives the articulated bracket 38 and the arcuate bracket 18 inwardly with respect to the motor vehicle 12. The motor 28, again energized with a polarity to create a rotational force in a direction opposite that in which is required to open the liftgate 10, then drives the liftgate 10 away from its open position toward the closed position. The motor 28 drives the drive nut 34 to move the articulated bracket 38 enough to force the liftgate 10 to a position where the gas assist struts 14 can no longer support the mass of the liftgate 10 and the liftgate 10 falls to its closed position for subsequent latch cinching.

Figure 5:
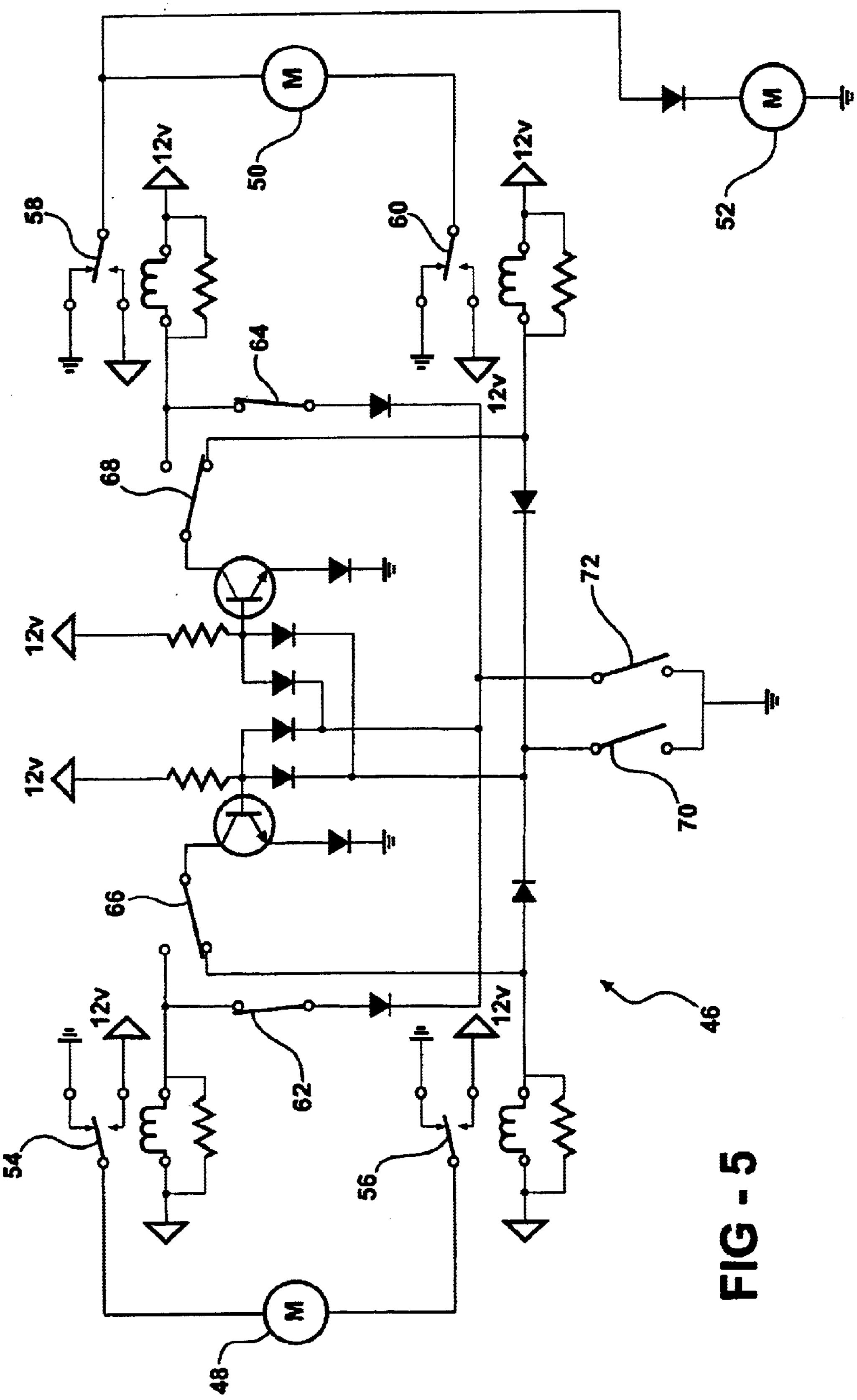
FIG. 5 is an electric schematic view of one embodiment of a control circuit for operating the invention.

Referring to FIG. 5, a control circuit is generally shown at 46. The control circuit 46 includes the operation of three motors 48, 50, 52. The third motor 52 is a latch motor. The latch motor 52 moves the latch (not shown) between latched and unlatched positions.

The other two motors 48, 50 are actuator motors. The actuator motors 48, 50 move the articulated brackets 38 through their respective range of motions. The actuator motors 48, 50 are bidirectional and have single pole double throw switches 54, 56, 58, 60 to switch the two actuator motors 48, 50 between directions by reversing the direction of current passing therethrough.

The control circuit 46 also includes end of travel switches 62, 64 that will disengage the actuator motors 48, 50 when the slide 40 reaches either of the first 25 or second 27 ends of the elongated bracket 26. The control circuit 46 also includes a pair of single pole double throw switches 66, 68 that identify the location of the drive nut 34 as it moves along the lead screw 32. The control circuit 46 also includes two operator switches 70, 72. The first operator switch 70 indicates that the liftgate 10 is to be closed whereas the second operator switch 72 indicates that the liftgate 10 is to be opened.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A power liftgate assembly for moving a liftgate between an open position and a closed position with respect to a motor vehicle having a roof, said power liftgate assembly comprising:

an elongated bracket fixedly secured to the roof of the motor vehicle, said elongated bracket extending between first and second ends;

a motor fixedly secured to said elongated bracket;

a slide operatively engaged with said motor for moving along said elongated bracket;

an articulated bracket connected to said slide for moving with said slide, said articulated bracket including a slot extending therealong providing lost motion between said articulated bracket and said slide allowing manual operation of the liftgate; and an arcuate bracket extending between said articulated bracket and the liftgate for receiving movement of said articulated bracket and moving the liftgate in response thereto upon energizing said motor.

2. A power liftgate assembly as set forth in claim 1 including a lead screw operatively connected between said motor and said slide for translating rotational motion of said motor into an axial motion of said slide.

3. A power liftgate assembly as set forth in claim 2 including a drive nut threadingly engaged with said lead screw for moving therealong when said lead screw is rotating, said drive nut engagable with said articulated bracket to force the liftgate between the open and closed positions.

4. A power liftgate assembly as set forth in claim 3 including a nut switch located along said elongated bracket, said nut switch identifying a position of said drive nut.

5. A power liftgate assembly as set forth in claim 4 including a glide extending between said slide and said elongated bracket to facilitate said slide as the slide moves along said elongated bracket.

6. A power liftgate assembly as set forth in claim 5 including a control circuit that controls said motor to drive said drive nut to said nut switch after said slide reaches one of said first and second ends of said elongated bracket.

7. A power liftgate assembly for moving a liftgate between an open position and a closed position with respect to a motor vehicle having a roof, said power liftgate assembly comprising:

an elongated bracket fixedly secured to the roof of the motor vehicle, said elongated bracket extending between first and second ends;

a motor fixedly secured to said elongated bracket, said motor generating a force;

a slide operatively engaged with said motor for moving along said elongated bracket;

an articulated bracket connected to said slide for moving with said slide, said articulated bracket including a slot extending therealong providing lost motion between said articulated bracket and said slide allowing manual operation of the liftgate;

a drive unit operatively connected with said motor for receiving said force thereof and for moving said slide along said elongated bracket; and an arcuate bracket extending between said articulated bracket and the liftgate for receiving movement of said articulated bracket and moving the liftgate in response thereto upon energizing said motor.

8. A power liftgate assembly as set forth in claim 7 including a lead screw operatively connected between said motor and said drive unit for translating rotational motion of said motor into an axial motion of said drive unit.

9. A power liftgate assembly as set forth in claim 8 wherein said drive unit includes a drive nut threadingly engaged with said lead screw.

10. A power liftgate assembly as set forth in claim 9 including a nut switch located along said elongated bracket, said nut switch identifying a position of said drive nut.

11. A power liftgate assembly as set forth in claim 10 including a glide extending between said slide and said elongated bracket to facilitate said slide as the slide moves along said elongated bracket.

12. A power liftgate assembly as set forth in claim 11 including a control circuit that controls said motor to drive said drive nut to said nut switch after said slide reaches one of said first and second ends of said elongated bracket.

13. A method for operating a power liftgate assembly for a liftgate of a motor vehicle including a motor, a lead screw driven thereby, a drive nut, a nut switch, an elongated bracket having first and second ends, an articulated bracket having a slot and an arcuate bracket, the method comprising the steps of:

energizing the motor to generate a rotational force in one direction;

rotating the lead screw;

moving the drive nut axially along the lead screw in response to the lead screw rotating;

moving the articulated bracket and the arcuate bracket to force the liftgate to move using the drive nut;

identifying when the drive nut reaches one of the first and second ends of the elongated bracket;

reversing the motor to generate a rotational force in an opposite direction to move the drive nut away from the one of the first and second ends; and stopping the drive nut at a position along the lead screw adjacent the nut switch.

14. A method as set forth in claim 13 including the step of moving the drive nut through the slot in the articulated bracket during the step of reversing the motor.

15. A method as set forth in claim 14 including the step of continuing to energize the motor to generate the rotational force in the opposite direction driving the drive nut past the nut switch when the liftgate is to be moved to another position.

* * * * *